United States Patent Office 3,478,015
Patented Nov. 11, 1969

3,478,015
PROCESS FOR REACTING AMINO ACID AND AN ACTIVE CARBONYL SUGAR IN A POLYHYDRIC ALCOHOL
Isao Onishi, Tokyo, Akira Nishi, Saitama-ken, and Tadao Kakizawa, Tokyo, Japan, assignors to Yuki Gosei Kogyo Co., Ltd., Tokyo, Japan, a corporation of Japan
No Drawing. Filed Nov. 14, 1966, Ser. No. 593,633
Int. Cl. C07c 47/18; A23l 1/26
U.S. Cl. 260—211                                   7 Claims

ABSTRACT OF THE DISCLOSURE

A method for manufacturing novel aromatics, comprising causing a reaction between an amino acid and a sugar by heating them in the presence of a polyhydric alcohol, thereby obtaining the reaction product which contains no unreacted amino acid and which can therefore be used as a flavoring.

---

The present invention relates to a method of manufacturing a novel aromatic by an appropriate reaction between an amino acid, sugar and a polyhydric alcohol, and more particularly to a method for producing a novel aromatic characterized by the step of heating an amino acid and sugar in the presence of a solvent consisting of a polyhydric alcohol such as glycerine, ethylene glycol, propylene glycol or butyleneglycol to effect a reaction therebetween in such manner that no free amino acid remains in the product of the reaction.

The aromatics of the present invention are for use in foods and luxuries such as coffee or tobacco. In the past, amino acids have been added to foods chiefly because they promote the taste of the foods or because they have a high nutrition value. Products obtained from the reaction between amino acids and sugars upon heating, which is called an amino-carbonyl reaction, however, have been seldom utilized for practical purposes.

In this specification, the term "aromatic" is used in its broad sense, i.e. to designate an aroma-bearing substance.

While it is known that the products obtained from the amino-carbonyl reaction have brown colors and unique flavors, the mechanisms of these reactions have been reported to consist of the following steps, namely, a condensate of an amino acid and a sugar is caused, by Amadori rearrangement, to produce ketose, and the sugar molecules then undergo decomposition, condensation or polymerization. The resulting substances, especially the aldehyde, are used to constitute the principal element of the flavor. On the other hand, such substances as hydroxy methyl furfural are said to be responsible for the brown coloration.

The shades of the color vary, depending principally on the type of the sugar used. For example, glucose has a smaller coloration degree than fructose.

It has been known tha tthe flavors of the products are influenced, to some extent, by the type of the sugar used and by the conditions of the reaction performed, and that they are influenced chiefly by the type of the amino acid used, and also that each type of amino acid has its own flavor.

The respective aroma characteristics of the products obtained from the reaction between amino acids and sugars in the presence of methanol at 100° C. have been reported as follows:

| Amino acid | Aroma characteristics |
|---|---|
| Valine | Rye bread fragrance. |
| Leucine | Sweet smell, chocolate smell. |
| Isoleucine | Musty smell. |
| Proline | Burned protein-like smell. |
| Aspartic acid | Biscuit-like smell. |
| Phenylalanine | Flavor of violet. |

(Copied from Food Research, 25 (4) 491–494, 1960)

Several reports have been made on the research of the mechanism of the amino-carbonyl reaction between amino acids and sugars and also on the concept of imparting flavors to food by the addition of amino acids thereto. However, no report has been encountered which relates to the industrial utilization of products of a reaction between amino acids and sugars caused by heating.

The known method of manufacturing substances having flavors from amino acids and sugars comprises the step of heating various amino acids and sugars in the presence of water or a monohydric alcohol solvent such as methanol or ethanol.

In order to utilize the thermal condensation products of amino acids and sugars in foods and luxuries, especially as an aromatic for tobaccos and cigarettes, the inventors made an extensive study on their manufacturing methods, and have found that by appropriately reacting amino acids on sugars in the presence of a polyhydric alcohol, the products of the reaction can be effectively used, in their state just as they are produced, for foods or luxuries without requiring any additional process of refining the products.

The starting materials of the aromatics which are produced according to the method of the present invention are readily available in the market as industrial goods and these starting materials are produced in a chemically pure state, and as a consequence, the aromatics which are manufactured with these starting materials always can have a uniform quality by merely adequately controlling the manufacturing procedures. Besides, the products of the reaction do not require any additional process such as separation or refining. As such, the method of the present invention is advantageous from the industrial aspect.

Furthermore, the aromatics of the present invention are produced by a method which is fundamentally different from those for other compounded flavors. Even if the starting materials, for example, the amino acid, used is of the type which would give an undesirable effect upon the flavor of the product to be obtained, it is possible to obtain the desired satisfactory aromatic because it is manufactured by a process which does not allow any amino acid to remain in the product after completing the reaction.

In addition, the starting materials for producing the aromatics produced by the method of the present invention contain no water by nature. Except for the fact that about 0.2 mol (about 0.36% by weight) of water per 1 kg. of the total weight is formed as a by-product of reaction, the produced aromatics do not contain and are not associated with water. This is another feature of the present invention which differs from the conventional aromatics which are prepared by processing, namely, by extracting or condensing hydrous natural materials or hydrous compounds. This feature of the present invention not only allows quite easy control of the quality of the products, but also has an advantage that there is very little likelihood of the occurrence of degeneration and putrefaction of foods of or luxuries of certain types in which the aromatics of the present invention are used, due to the growth of micro-organisms in such foods or luxuries.

The aromatics of the present invention, on the other hand, are obtained in a uniform viscous liquid form which is soluble, in any proportion of the aromatic to water, in water. Therefore, it is quite easy to industrially utilize the aromatics of the present invention in case it is necessary to dilute them with water to impart aromas to foods or luxuries by spray means, or in case it is intended to use solutions of aromatics for dipping purposes. A further feature of the aromatics of the present invention is that the range of the volume of the aromatics to be used can be widened to a substantial extent over those of the conventional aromatics without adversely affecting the aromas in any degree.

The amino acids which can be used in the present invention include amino acids which are used in general such as glycine, proline, alanine, serine, valine, leucine, isoleucine, phenylalanine, glutamic acid, $\gamma$-amino-butyric acid and aspartic acid. However, they are not restricted thereto, but rather all the amino acids which can be used in the aminocarbonyl reaction have been found to be effective.

With respect to the sugars, glucose is most generally used. However, other than glucose, monosaccharides and polysaccharides such as fructose or maltose can be used also. Any sugar having an active carbonyl group can be used.

As for the solvents, glycerine, ethylene glycol, propylene glycol and 1,3-butylene glycol are used. In general, any polyhydric alcohol satisfies the object of the present invention. In conducting a reaction according to the present invention by the combined use of the aforesaid starting materials, it is necessary that the reaction be completed so as to minimize any residual amino acid in the product of the reaction.

After reviewing, therefore, various conditions of the reaction, the inventors have noted the necessity that the amino acid and the sugar used for the reaction be dissolved completely in the solvent and also that the reaction ratio of the respective materials be so determined as not to cause any unreacted amino acid to remain in the product of the reaction. Such ratio varies with the type of the solvent, the amino acid and the sugar used. Furthermore, there are some types of the amino acids which, while completely dissolving with respect to the starting materials involved, would produce precipitates with the progress of the reaction because of the difference in their individual solubilities. Thus, there should be a fairly extensive difference between each ratio, depending on the respective combination patterns of the starting materials. In general, the amino acid to solvent ratio is in the range of 1 to 3% by weight, and the sugar to solvent ratio is in the range of 3 to 15% by weight. However, it is impossible to particularly determine the range of the ratios in general. Also, in some reactions between amino acids and sugars which are performed by the method of the present invention, malonic acid or succinic acid is used as a condensation catalyst. The presence of a catalyst, however, is not indispensable for the completion of the reaction of the present invention.

With respect to the temperature and the time of the reaction, a temperature in the range between 70° C. and 90° C. and a duration of reaction in the range from 5 to 15 hours are mostly effective to obtain satisfactory aromatics. It is to be noted, however, that some reactions require a temperature and a duration which depart from the aforesaid ranges, and therefore, the time and the temperature cannot be fixed to certain limited ranges.

The following table shows the results of some examples of the manufacturing conditions of the present invention. It is to be noted that the sugar used in these examples was D-glucose and the catalyst used was malonic acid. The temperature in the reaction was uniform at 80° C.

| Solvent, weight in g. | Amino acid, weight in g. | Sugar weight in g. | Catalyst, weight in g. | Reaction time in hours | Aroma characteristic or product |
|---|---|---|---|---|---|
| (1) P G 100 | Glycine 0.8 | 5.4 | Nil | 8 | Acidic odor. |
| (2) B G 500 | Proline 11.5 | 54.0 | 2.3 | 7 | Degenerated protein. |
| (3) B G 500 | α-Alanine 8.9 | 54.0 | 1.8 | 7 | Apricot-like odor |
| (4) P G 100 | β-Alanine 0.9 | 5.4 | 0.2 | 7 | Acidic odor. |
| (5) B G 500 | β-Alanine 3.6 | 21.6 | 0.7 | 5 | Ester-like fragrance. |
| (6) B G 500 | Serine 10.5 | 54.0 | 2.1 | 27 | Acidic odor. |
| (7) B G 500 | Valine 11.7 | 54.0 | 2.3 | 20 | Coffee-like flavor. |
| (8) B G 500 | Leucine 13.1 | 54.0 | 2.6 | 5 | Lard or cheese-like flavor. |
| (9) B G 500 | Phenylalanine 16.5 | 54.0 | 1.6 | 7 | Sweet-sour odor. |
| (10) B G 500 | γ-Amino butyric acid 10.3 | 54.0 | Nil | 12 | Acidic odor. |
| (11) B G 500 | do | 54.0 | 2.0 | 3 | Sweet odor. |
| (12) B G 500 | Aspartic acid 6.7 | 54.0 | 1.3 | 24 | Strong ester-like fragrance. |

NOTE.—Solvents: P G represents propylene glycol; B G represents 1,3-butylene glycol.

Discussion will next be directed to the effect of the use of the aromatics obtained by the method of the present invention. In connection with foods, these aromatics are limited to those foods in which coloration is not important. For example, they can be used as a flavor element in cheese, cookies, sponge cakes and the like. The finished goods in which the aromatics of the present invention are used fully display their own unique flavors without their own quality and taste being damaged in any way, and thus the aromatics serve to whet one's appetite. Also, in case the aromatics are used in luxuries, especially in tobaccos and cigarettes, they not only promote the flavors peculiar to the tobacco leaves but also enhance their taste as they are smoked, and also correct or reduce, in general, such defects as the irritating sensation, bad odor and poor taste (want of body) which are felt by the smokers, and can create a balanced, mellow taste when the tobaccos and cigarettes are smoked. Above all, the aromatics of the present invention can completely arrest a series of foreign odors and irritations such as the so-called burning smell, paper smell or biting sensation which are produced during combustion. This is an important feature of the aromatics of the present invention.

Some examples of the manufacture and the use of the aromatics of the present invention are given below.

EXAMPLE 1

After completely dissolving 54.0 gr. of D-glucose (0.3 mol), 10.3 gr. of γ-amino butyric acid (0.1 mol) and 2.0 gr. of malonic acid as a catalyst in 500 gr. of 1,3-butylene glycol, the resulting liquid was heated at 80° C. for 3 hours to effect thermal condensation. The product of reaction was a viscous liquid having a dark brown color and a sweet flavor.

The product aromatic was applied, in an amount of 1% by weight, to a tobacco stock consisting of 1 part of domestic sun cured leaves (Matsukawa-hu, for example) and 9 parts of a mixture comprising 35 parts of domestic flue cured leaves, 30 parts of American flue-cured leaves, 20 parts of other flue-cured leaves and 15 parts of conventional leaves. The aforesaid treated stock was formed into cigarettes with filter mouthpieces, and they were compared with non-treated cigarettes.

Examination

The effect of the treatment with the aromatic was evaluated by six examiners, in the form of panel examination with respect to the following points, namely, aroma, taste, stimulation, body, harmony between the flavor and the taste, and after taste.

Result of examination

The result is summarized as follows. The cigarettes which were not treated with the aromatic showed a reduced characteristic flavor of the yellow leaves and presented a plain but slightly irritating taste. The non-treated cigarettes were poor in their body when smoked. No particular sensation was noted with respect to harmony and after-taste.

The cigarettes treated with the aromatic presented an intense fragrance and rich mellow taste with no stimulating sensation. They were felt to be rich in taste and harmonized as a whole, and no particular after-taste was felt. These treated cigarettes were noted to have an effect that the flavor of the flue-cured leaves was emphasized.

EXAMPLE 2

After completely dissolving 54.0 gr. (0.3 mol) of D-glucose, 8.9 gr. (0.1 mol) of α-alanine and 1.8 gr. of malonic acid as a catalyst in 500 gr. of 1,3-butylene glycol, reaction was performed at 80° C. for 7 hours. The obtained product had an apricot-like odor. This product was added, each in an amount of 1% by weight, to cigarettes named "Shinsei" (trade name) and also to veins of threshed flue cured leaves. Cigarettes treated with the aromatic were compared with non-treated articles.

Method of examination

The result is summarized as follows:

In the case of "Shinsei" cigarettes, those treated with the aromatic were superior in flavor, taste stimulation and body, and presented mellow, mild taste as compared with non-treated Shinsei cigarettes.

Shinsei cigarettes containing aromatic-treated veins were noted to be moderate particularly in the smell of veins and in stimulation. The entire flavor and taste were noted to have been reformed. Treated Shinsei cigarettes clearly showed the effect of the treatment.

EXAMPLE 3

After completely dissolving 54.0 gr. (0.3 mol) of D-glucose, 16.5 g.r. (0.1 mol) of phenylamine and 2.0 gr. of succinic acid as the catalyst in 500 gr. of propylene glycol, the mixture was subjected to reaction at 80° C. for 7 hours. The obtained reaction product was a viscous liquid of a dark brown color and having a honey-like aroma.

The obtained product was added, in an amount of 2.0% by weight, to castella stock (a kind of sponge cake) comprising eggs, sugar, flour and a small quantity of table salt. After thoroughly mixing them, the stock was baked in a known manner, with a result that the product cake was of a lustre and was rich in flavor which was a honey-like aroma.

EXAMPLE 4

After completely dissolving 54.0 gr. (0.3 mol) of D-glucose, 11.7 gr. (0.1 mol) of valine and 2.3 gr. of succinic acid as the catalyst in 500 gr. of propylene glycol, the mixture was heated at 80° C. for 20 hours to effect reaction.

The obtained reaction product was a viscous liquid of a dark brown color having a chocolate-like smell. This was added, in an amount of 2.0% by weight, to a custard pudding stock comprising eggs, sugar and milk, and was thoroughly mixed therewith. The resulting mixture was poured into pudding moulds containing caramel sauce which had been prepared separately, and they were subjected to steaming.

The resulting pudding was a delicious one having a chocolate-like aroma.

In case said reaction product was added to caramel sauce, the obtained pudding also showed an excellent flavor.

What is claimed is:

1. A method of manufacturing aroma-bearing products, which comprises reacting an amino acid and a sugar having an active carbonyl group in a lower alkyl polyhydric alcohol solvent in the absence of added water and in such reactant ratios as to avoid any unreacted amino acid remaining in the product.
2. The method of claim 1, wherein the reaction temperature is below about 90° C.
3. The method of claim 1, in which the solvent is propylene glycol.
4. The method of claim 1, in which the solvent is 1,3-butylene glycol.
5. The method of claim 1, in which the sugar used is in the range of 3% to 15% by weight of the polyhydric alcohol.
6. The method of claim 1, in which the reaction is carried out between 70° C. and 90° C.
7. The method of claim 1, in which the polyhydric alcohol is a member of the group consisting of glycerol, ethylene glycol, propylene glycol and butylene glycol.

References Cited

UNITED STATES PATENTS

| | | | |
|---|---|---|---|
| 2,710,860 | 6/1955 | Ruskin | 260—211.5 |
| 2,808,401 | 10/1957 | Erickson | 260—211 |

OTHER REFERENCES

Pigman: "The Carbohydrates," pp. 446–450, 1957, Academic Press Inc., New York, N.Y.

LEWIS GOTTS, Primary Examiner

J. R. BROWN, Assistant Examiner

U.S. Cl. X.R.

99—86, 115, 139, 140; 131—17